United States Patent
Kaufman

[15] 3,661,609
[45] May 9, 1972

[54] METHOD FOR PREPARING NACREOUS PIGMENTS

[72] Inventor: Harold Kaufman, Freehold, N.J.

[73] Assignee: Whittaker Corporation

[22] Filed: Nov. 2, 1970

[21] Appl. No.: 86,272

[52] U.S. Cl..............................106/291, 106/292, 106/297, 106/301
[51] Int. Cl..........................................C09c 1/00, C09c 1/04
[58] Field of Search..............106/291, 292, 297, 301, 308 N, 106/308 Q, 309; 23/105

[56] References Cited

UNITED STATES PATENTS

| | | | |
|---|---|---|---|
| 2,703,747 | 3/1955 | Thornton | 23/105 |
| 2,979,108 | 4/1961 | Thompson | 106/291 |

*Primary Examiner*—Tobias E. Levow
*Assistant Examiner*—J. V. Howard
*Attorney*—Donald E. Nist and Jay H. Quartz

[57] ABSTRACT

Improved pearlescent pigments are prepared by combining an aqueous, divalent metal salt solution with an aqueous solution comprising an alkali metal biphosphate or ammonium phosphate and a reducing agent. The combination of solutions yields metal acid phosphate or metal ammonium phosphate in crystalline form with a portion of the metal reduced to the free metallic state. The metal acid or ammonium phosphate crystals are plated onto the surface of mica or similar material at the time of formation in the presence of a cationic wetting agent within the aqueous reaction media.

30 Claims, No Drawings

METHOD FOR PREPARING NACREOUS PIGMENTS

BACKGROUND OF THE INVENTION

Nacreous metal phosphate crystals are desirable products for use in a number of application due to their lustrous characteristics. Such materials are an economically attractive substitute for guanine where pearlescent luster is desired with the latter being of sufficiently high cost to be unattractive from a commercial standpoint. The metal phosphates accordingly have been produced in large quantities and used, for example, disposed in a clear resin matrix for ornamental purposes, the products being characterized by a "mother-of-pearl" appearance.

The metal phosphates have been produced by a variety of techniques many of which are described in the literature and well known to those skilled in the art. The classical method of producing these products and especially lead acid phosphate has been described in U.S. Pat. No. 2,103,007 to Hunsdiecker. The method describes lead acid phosphate precipitated by reacting a solution of a lead salt with phosphoric acid in the presence of water soluble organic compounds such as alcohol, acetic acid, acetone, etc. Subsequently, other methods have been suggested including the preparation of divalent metal ammonium phosphates prepared by reacting a water soluble metal salt in the presence of phosphoric acid and ammonia. However, a number of such previously proposed methods yield nacreous products that are somewhat lacking in high luster and brilliance.

SUMMARY OF THE INVENTION

The present invention describes a process for preparing nacreous crystals having improved luster and brilliance which comprises precipitating metal acid or ammonium phosphates in the presence of a reducing agent. The metal acid phosphates are formed in aqueous media in which the reducing agent reduces a portion of the precipitating metal phosphate to the free metallic state. The combination of free metal and metallic phosphate yields the improved nacreous or pearlescent characteristics. This crystal pigment composition may be precipitated or plated on to the surface of mica from the reaction mixture in the presence of a cationic wetting agent. Not only are improved crystals developed by the above method, but the process including mica plating is simple, efficient and may be readily used on a commercial basis. These, as well as other advantages will be evident from the following detailed description.

DETAILED DESCRIPTION OF THE INVENTION

In general the nacreous pigment crystals are produced by combining a divalent metal salt soluble in the aqueous reaction media with a phosphate and a reducing agent. The particular divalent metal utilized may be one of a variety of divalent metals such as nickel, cobalt, cadmium, lead, and zinc. The metal selected should be one which in the divalent state is readily reduced to the free metal in the presence of a reducing agent which will be described hereinafter. The preferred metal is zinc because of the highly pearlescent phosphate-metal crystal compositions which are produced according to this process.

The water-soluble divalent metal salt may be either organic or inorganic such as acetate, nitrate, formate, and sulfate with individual selection of the anionic moiety selected on the basis of availability, solubility, non-interference with phosphate precipitation and non-reduction in the reaction media. Water-soluble salts having oxidizing properties such as the bromates are unsuitable because their oxidizing capability interferes with the desired metal reduction. Acetates are preferred because of their availability as well as solubility, ease of handling, and low toxicity.

The reaction solution contains an ingredient for providing the metal acid or ammonium phosphate radical and from which the corresponding metal acid or ammonium phosphate crystals are produced. Suitable materials are the alkali metal biphosphates such as sodium or potassium biphosphate, the corresponding alkali metal ammonium phosphates and phosphoric acid. The latter is particularly useful when used in combination with zinc acetate. The phosphate may be present in any suitable concentration but preferably sufficient to precipitate the desired quantity of metal phosphate crystals. Accordingly, an amount stoichiometrically equivalent to the amount of divalent metal salt is preferred although any quantity may be used.

A number of suitable reducing agents may be utilized in the reaction to effectively reduce a portion of the divalent metal present to the free metal state. Reducing agents may be organic or inorganic so long as they are effective in the aqueous media. Organic reducing agents include hydrazine, reducing sugars such as glucose or maltose, and formaldehyde.

Effective inorganic reducing agents include, for example, hydroxylamine and its salts such as hydroxylamine hydrochloride, hypophosphorous compounds such as hypophosphorous acid, sodium and potassium hypophosphite, thiosulfates such as ammonium thiosulfate and sodium thiosulfate, ferrous compounds such as ferrous ammonium sulfate, alkali metal nitrites such as sodium and potassium nitrites, and alkali metal hydrosulfites. Such reducing agents are by way of example only and are not to be considered exhaustive of suitable reducing compounds which may be used as will be understood by those skilled in the art.

The use of hydroxylamine itself or in salt form is presently preferred. The hydroxylamine may be added as one of the reaction components or it may be formed within the reaction mixture by reaction of other components. For example, advantage may be taken of the fact that hydroxylamine is produced by the reaction of metallic zinc with nitric acid. Thus, where the divalent metal salt is, for example, zinc acetate, an amount of nitric acid may be added to a solution of the divalent metal salt and phosphate in place of a reducing agent. The amount of nitric acid added will be that amount which will produce the requisite amount of hydroxylamine. This can be determined from the chemical equation describing the formation of hydroxylamine from zinc and nitric acid.

The amount of the reducing agent present in the reaction mixture may be varied between any desired limits depending on the proportionate amount of divalent metal reduction desired. Accordingly, the greater the amount of the reducing agent present in the reaction mixture, the greater will be the concomitant amount of free metal in the nacreous phosphate crystal composition. This feature of in situ metal reduction offers the advantage in that the luster and brilliance of the pearlescent product may be tailored to any desired appearance.

It will be appreciated that for different metals the optimum amount of pure metal within the nacreous phosphate composition to yield the desired appearance will be varied. For example, where 40 percent by weight of the divalent zinc present in zinc acid phosphate is to be reduced to the free metal state, the required amount of specific reducing agent is easily calculated and may be used. Suitable amounts of metal reduction may be between about 5 percent and about 85 percent with specific amounts of reduction depending on the particular metal involved and desired product appearance. It has been noted that the reduction of about 40 percent to about 60 percent of the divalent metal in the nacreous phosphate crystals yields an exceptionally lustrous composition.

The preferred method of precipitating the metal acid of ammonium phosphate comprises mixing an aqueous solution containing the divalent metal salt with an aqueous solution of the reducing agent and phosphate. The specific concentrations of the two solutions may be varied, first to insure that the soluble ingredients are completely dissolved as well as to give an aqueous phase in which both the precipitating crystals as well as the reaction by-products are well dispersed. Accordingly, the greater the amount of water present the lower will be the concentration of reaction by-products which, in turn, reduces the concentration of these materials which contaminate precipitating product crystals. Specific concentrations accordingly may be varied as will be understood by those skilled in the art.

The two solutions are brought together with vigorous agitation until crystal formation is essentially complete. It is preferred to add the phosphate and reducing agent-containing aqueous solution to the divalent metal salt solution, with continuous mixing which is preferably vigorous. The phosphate and reducing agent solution may be added in portions, intermittently or continuously or may be added at one time to the metal salt solution. Regardless of the mixing technique, precipitation of the metal phosphate begins almost immediately with the initial particles being amorphous and becoming crystalline as mixing is continued. As the reaction begins, a portion of the divalent metal will be reduced by action of the reducing agent to form free metal which precipitates with the phosphate particles. It is this free metal formation that yields the particularly bright pearlescent product according to the process of the invention.

The reaction temperature, that is, the temperature of the mixing solutions, is preferably between about 70° F. and about 190° F. with higher temperatures in this range being preferred. Temperatures approaching the solution boiling points should be avoided so as to prevent loss of water and upsetting the desired reaction concentrations. Preferably, the solutions are brought to the desired temperatures prior to mixing so that preferred temperatures during reaction are relatively easily maintained.

Following formation of the nacreous crystalline product the crystals are recovered by filtration, decantation of the aqueous solution or other methods including centrifuging. The crystals are then washed with water until free of contaminants such as acetic acid and alkali metal salts. Such recovery processes are well understood in the art and need not be described here in detail.

In another embodiment of the invention, the crystals prepared by the above described reaction are plated on an extending material such as mica during the precipitation process. Broadly, mica describes silicates of varying chemical composition and includes muscovite, a natural hydrous potassium aluminum silicane; hydrated silicates such as vermiculite, a hydrated magnesium-aluminum-iron silicate; lepidolite, a fluosilicate of potassium, lithium and aluminum, and the zeolites. Other extending materials such as diatomite may also be used. These materials are preferably used in quantities which do not interfere with the nacreous crystal quality. Accordingly, the weight amount of mica or equivalent materials present in the reaction mixture is preferably not greater than the weight amount of metal phosphate to be precipitated. The size of the mica particles should also be quite small and preferably of a U.S. or Tyler series mesh of greater than about 250.

In order to successfully plate the nacreous crystals onto the mica surface, it is found that the presence of a cationic wetting agent is required. In the absence of such a wetting agent, the mica will not sufficiently absorb the precipitating crystals to yield a product composition having the desired pearlescent qualities. Thus, where insufficient wetting of the mica surface occurs relatively low absorption will result which, in turn, in view of the comparatively dull surface qualities of mica will yield a product having inferior nacreous qualities.

Specific cationic wetting agents may be selected from a large group of materials. The hydrophobic group of the wetting agent may be aliphatic, aromatic or heterocyclic. The largest group of useful cationic wetting agents are the amine salts and quaternary ammonium salts. Suitable amine salts i.e. salts of an amine and an acid, are those in which the amine group is joined directly to the hydrophobic group or through an intermediate link such as an ester, amide or ether. The amine may be primary, secondary or tertiary with at least one hydrocarbyl group sufficiently hydrophobic. Octadecyl ammonium chloride and other straight chain fatty amine salts having eight to 18 carbon atoms in the hydrophobic group are typical amine salts. Other strong acids such as sulfuric acid may be used to form the amine salts. Typical amine salts in which the hydrophobic group is joined through an amide linkage are represented by:

wherein R is a long chain hydrophobic group and R', R'' and R''' are short chain alkyl groups. Corresponding ester and ether amine salts have the general formulae, respectively:

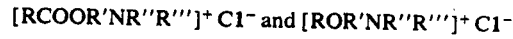

Quaternary ammonium compounds generally prepared by quaternizing any of the above noted amines with alkyl halides or sulfates are also active cationic surfactants which may be used. However, it has been found emperically that the amine salts are preferred over the corresponding quaternary compounds in satisfactorily wetting the mica surface. Other nitrogenous bases such as guanidines, hydrazines, amine oxides, basic nitrogen heterocyclics and non-nitrogenous bases such as sulfonium compounds and sulfides, that is, where the hydrophobic group is linked through a sulfide radical to the amine may be used.

THe above description of cationic surfactants is not intended to be exhaustive but merely exemplemary of the types of compounds which may be used.

The concentration of wetting agent is preferably between about 0.5 percent and about 5 percent by weight of the mica or other silicate material present in the reaction mixture. Although greater amounts may be used it is both unnecessary and undesirable from an economic standpoint unless surfactant recovery techniques are utilized. It is preferred to add the surfactant to the mica-containing aqueous mixture in order to thoroughly induce surface wetting and then add the divalent metal salt to the aqueous mixture to form the solution. It has also been found to be efficacious to add the mixture of reducing agent and surfactant to an aqueous misture of the silicate and, after thoroughly mixing these materials to insure complete wetting, to add the metal salt. As a result, a portion of the metal will be reduced to the metallic state and become absorbed onto the silicate surface. Following this, the alkali metal acid phosphate or ammonium phosphate is added to the mixture and the unreduced metal ions will form the metal acid or ammonium phosphate precipitate. This product will then become absorbed onto the silicate surface. Again, although the metal phosphate initially precipitates in amorphous form after the mixture is agitated for an additional time, the crystalline form results. Accordingly, both the free metal and the metal phosphate crystals are partially absorbed on the silicate surface and partially free to yield a composition which when recovered has a high degree of brilliance, luster and pearlescence. Of course, it will be appreciated that greater absorption of the product may be realized by the presence of larger amounts of silicate within the reacting mixture which, for the reasons indicated above, may not be preferred for optimum pearlescence.

In addition to the cationic surfactant or wetting agent, the presence of a polyol and, preferably, a glycol, is beneficial in aiding metal and phosphate plating on the extending material surface. The specific polyol does not appear to be critical and accordingly, ethylene, propylene, hexylene, and similar glycols, as well as water soluble polyethylene glycols may be used. Additionally, glycerine and water-soluble polyglycerols together with their esters may be employed. Amounts of polyol up to about 10 percent by weight or more based on the weight of extending material present are useful. The presence of the polyol further aids in dispersion of the extending material throughout the agitated reaction mixture thereby ensuring that the metal and phosphate are more evenly distributed on the extending material.

It is preferred to add the polyol to the aqueous composition containing the extending material prior to addition of the divalent metal salt. Accordingly, it is convenient to add the polyol with the cationic surfactant and reducing agent which materials may be combined and the mixture added to the aqueous extending material. Alternatively, these three materials may be added separately, but again prior to addition of the metal salt.

In either of the two embodiments described above, the nacreous phosphate formation is essentially the same. As the water soluble divalent metal salt is introduced into an aqueous solution containing the reducing agent, or where the reducing agent is added to the salt solution, reduction of the free metal ions is initiated, and precipitation of the metal occurs. Concurrently, since only a portion of the metal ions are reduced, that is, acted on by the reducing agent, the remaining metal ions combine with the acid or ammonium phosphate ions to produce crystals of the phosphate. As these crystals precipitate they are initially amorphous. Yet, as agitation of the reaction mixture is continued the precipitate changes from the amorphous state to crystalline platelets which are relatively thin and have a high index of refraction. These crystals being transparent produce a pearl-like luster due to the partial reflection of incident light and transmission of the unreflected light to lower crystal layers.

The presence of free metals which are shiny, and, particularly, metals such as zinc, further enhance the luster and brilliance of the nacreous product. Where silicates are not present in the reaction mixture, the precipitate itself, when allowed to completely crystallize, is simply made up of a mixture of the free metal and metal phosphate which mixture has been recovered for subsequent use. Where silicates such as mica are present as described above, the phosphate and free metals are partially absorbed on the silicate surface with the amount of unabsorbed product dependent on the amount of mica present. However, the product absorbed onto the silicate surface is found to be an integral part thereof and is not separated by physical means and thus provides a useful composition. The advantages of such a product will be well understood by those skilled in the art.

This method is particularly suitable in the formation of zinc and nacreous zinc phosphate crystals and accordingly this metal is preferred. The presence of metallic zinc which itself is lustrous in appearance lends additional brilliance to the pearlescent zinc phosphate crystal formation.

The following examples are provided to illustrate the manner in which the invention is carried out.

EXAMPLE I

Solution A, consisting of 3 liters of water and 158 grams zinc acetate was prepared and heated to 190° F. Solution B was prepared by adding 100 grams of sodium biphosphate and 10 grams of hydroxylamine hydrochloride to 500 cc of water. Solution B was then added to solution A under vigorous agitation. A white amphorous precipitate occurred immediately and agitation was continued for about 30 minutes. During this time, the amphorous precipitate became crystalline and the final product was white, lustrous and having a desirable mother of pearl appearance with a shiny silver gray cast being due to the presence of free metallic zinc. The aqueous solution was decanted from the crystalline product which was then recovered and washed with distilled water until filtrate analysis showed essentially complete removal of acetic acid.

EXAMPLE II

The above example was repeated with the exception that 10 grams of hypophosphorous acid was substituted for the reducing agent in the solution B. The product recovered was essentially identical with that of example I.

Additional products were prepared substituting formaldehyde and hydrazine for the reducing agent.

EXAMPLE III

Into approximately 3.8 liters of water was added 70 grams of mica which mixture was vigorously agitated while heating to 190° F. To the heated mixture was added 3 grams of Aerosol C-61 (an ethanolated alkyl guanidine-amine complex), , 10 grams of hydroxylamine hydrochloride and 10 grams of hexylene glycol. The mixture was continuously stirred for about 10 minutes until the mica was thoroughly wetted. To this mixture was added 60 grams of zinc acetate after which stirring was further continued for another 10 minutes. Thereafter, 100 grams of mono sodium phosphate were added to the mixture and zinc acid phosphate was noted to immediately form as amphorous precipitate. The mixture was further agitated for about 1 hour while maintaining a temperature of about 190° F. The initially amorphous crystals became crystalline with the bright, lustrous nacreous appearance. The liquid phase was decanted and the pearlescent product washed with distilled water until traces of acetic acid were removed and the composition dried. It was found that a portion of the nacreous zinc hydrogen phosphate crystals were absorbed onto the surface of the mica and could not be separated by physical means. In addition, the presence of free metallic zinc to the composition rendered its appearance shiny blue-gray.

I claim:

1. A method of preparing a crystalline nacreous pigment, comprising:
    admixing, in an aqueous medium
    a. a water-soluble, divalent metal salt,
    b. a phosphate selected from the group consisting of alkali metal biphosphates, alkali metal ammonium phosphate, and phosphoric acid, and
    c. an effective amount of a reducing agent capable of reducing at least a portion of the divalent metal in said divalent metal salt to its free metal form
    to form an aqueous solution of said (a), (b) and (c) from which said nacreous pigment precipitates.

2. The method of claim 1 including the additional step of recovering said nacreous pigment from said solution.

3. The method of claim 1 including, in addition, admixing with said (a),(b) and (c).
    d. an extending material and
    e. an effective amount of a cationic wetting agent to aid in wetting said extending material, to thereby cause said nacreous pigment to plate onto said extending material to produce a pearlescent product; and
    separating said pearlescent product from said solution.

4. The method of claim 3 wherein said amount of said cationic wetting agent is between about 0.5 percent and about 5 percent by weight of the weight of said extending material.

5. The method of claim 3 wherein said extending material is selected from the group consisting of mica and diatomite.

6. The method of claim 3 wherein an effective amount of a polyol is admixed with said (a),(b),(c),(d) and (e).

7. The method of claim 6 wherein said polyol is selected from the group consisting of ethylene glycol, propylene glycol, hexylene glycol, water-soluble polyethylene glycol, water-soluble polyglycerol and glycerine.

8. The method of claim 1 wherein an aqueous solution of said divalent metal salt is mixed with an aqueous solution of said phosphate and said reducing agent.

9. The method of claim 8 wherein each said solution is heated to a temperature between about 70° F. and about 190° before said solutions are mixed and wherein the combined solution is maintained at said temperature until said nacreous pigments are formed.

10. The method of claim 1 wherein said divalent metal is selected from the group consisting of nickel, cobalt, cadmium, lead and zinc.

11. The method of claim 10 wherein the anionic portion of said divalent matal salt is selected from the group consisting of acetate, nitrate, formate and sulfate.

12. The method of claim 1 wherein said reducing agent is an organic reducing agent selected from the group consisting of hydrazine, glucose, maltose and formaldehyde.

13. The method of claim 1 wherein said reducing agent is an inorganic reducing agent selected from the group consisting of hydroxylamine, hydroxylamine hydrochloride, hypophosphorous acid, sodium and potassium hypophosphite, sodium thiosulfate, ammonium thiosulfate, ferrous ammonium sulfate, sodium nitrate, potassium nitrate, sodium hydrosulfite and potassium hydrosulfite.

14. The method of claim 1 wherein the amount of reducing agent is sufficient to reduce between about 5 percent and about 85 percent by weight of said divalent metal to said free metal form.

15. The method of claim 1 wherein said solution is vigorously stirred until substantially all of said nacreous pigment is in crystalline form.

16. The method of claim 1 wherein said aqueous solution is heated to a temperature between about 70° F. and about 190° F.

17. A method of preparing nacreous pigments, comprising the steps of:
admixing, in an aqueous medium,
 a. a water-soluble, divalent metal salt, the divalent metal of said salt being selected from the group consisting of nickel, cobalt, cadmium, lead and zinc and the anionic portion of said divalent metal salt being selected from the group consisting of nitrate, acetate, formate and sulfate,
 b. A phosphate selected from the group consisting of alkali metal biphosphates, alkali metal ammonium phosphate, and phosphoric acid, and
 c. A reducing agent capable of reducing the divalent metal in said divalent metal salt to its free metal form, said reducing agent being present in an amount sufficient to reduce about 5 percent to about 85 percent by weight of said divalent metal,
to form an aqueous solution of said (a),(b) and (c) from which said nacreous pigments precipitate;
heating said nacreous solution to a temperature between about 70° F. and about 190° F.;
stirring said heated aqueous solution to facilitate formation of crystalline nacreous pigments; and
separating said nacreous pigments from said aqueous solution.

18. The method of claim 17 wherein (d) an extending material selected from the group consisting of mica and diatomite and (e) a cationic wetting agent to aid in wetting said extending material are admixed with said (a),(b) and (c) to cause plating of said nacreous pigments onto said extending material, said nacreous pigments being separated from said aqueous solution on said extending material.

19. The method of claim 18 wherein said amount of said cationic wetting agent is between about 0.5 percent and about 5 percent by weight of the weight of said extending material.

20. The method of claim 17 wherein said reducing agent is organic and is selected from the group consisting of hydrazine, glucose, maltose and formaldehyde.

21. The method of claim 17 wherein said reducing agent is inorganic and is selected from the group consisting of hydroxylamine, hydroxylamine hydrochloride, hypophosphorous acid, sodium and potassium hypophosphite, sodium thiosulfate, ammonium thiosulfate, ferrous ammonium sulfate, sodium nitrate, potassium nitrate, sodium hydrosulfite and potassium hydrosulfite.

22. A method of preparing a nacreous pigment comprising the steps of:
admixing, in aqueous medium,
 a. zinc acetate,
 b. a phosphate selected from the group consisting of alkali metal biphosphates, alkali metal ammonium phosphate, and phosphoric acid, and
 c. nitric acid in an amount sufficient to produce a predetermined amount of hydroxylamine,
to form an aqueous solution of said (a), (b) and (c) from which said nacreous pigments precipitate;
heating said aqueous solution to a temperature (a),(b) 70° F. and about 190° F.;
stirring said heated aqueous solution until substantially all of said nacreous pigments formed in said aqueous solution have crystallized; and
separating said nacreous pigments from said aqueous solution.

23. The method of claim 22 wherein (d) an extending material and (e) an effective amount of a cationic wetting agent are admixed with said (a),(b) and (c) to cause said nacreous pigments to plate onto said extending material, said nacreous pigments being separated from said aqueous solution in combination with said extending material.

24. The method of claim 23 wherein said extending material is one of the group of mica and diatomite.

25. The method of claim 24 wherein said amount of said cationic wetting agent is between about 0.5 percent and about 5 percent by weight of the weight of said extending material.

26. The method of claim 23 wherein an effective amount of a polyol selected from the group consisting of ethylene glycol, propylene glycol, hexylene glycol, water-soluble polyethylene glycol, water-soluble polyglycerol and glycerine is admixed with said (a),(b),(c),(d) and (e).

27. The nacreous pigment product made by the process of claim 2.

28. The pearlescent product made by the process of claim 3.

29. The nacreous pigment made by the process of claim 22.

30. The pearlescent product made by the process of claim 23.

* * * * *